US012668209B2

(12) United States Patent
Girodot

(10) Patent No.: US 12,668,209 B2
(45) Date of Patent: Jun. 30, 2026

(54) CRANK PIN, BALL JOINT AND CORRESPONDING WIPER ACTUATING LINKAGE SYSTEM AND METHOD FOR THE ASSEMBLY THEREOF

(71) Applicant: Valeo Systemes d'Essuyage, La Verriere (FR)

(72) Inventor: Cyrille Girodot, La Verriere (FR)

(73) Assignee: Valeo Systemes d'Essuyage

( * ) Notice: Subject to any disclaimer, the term of this patent is extended or adjusted under 35 U.S.C. 154(b) by 1149 days.

(21) Appl. No.: 17/639,737

(22) PCT Filed: Jul. 27, 2020

(86) PCT No.: PCT/EP2020/071163
§ 371 (c)(1),
(2) Date: Aug. 5, 2022

(87) PCT Pub. No.: WO2021/047812
PCT Pub. Date: Mar. 18, 2021

(65) Prior Publication Data
US 2022/0379848 A1 Dec. 1, 2022

(30) Foreign Application Priority Data
Sep. 9, 2019 (FR) ...................................... 1909902

(51) Int. Cl.
*B60S 1/24* (2006.01)
*F16C 11/06* (2006.01)

(52) U.S. Cl.
CPC ............. *B60S 1/24* (2013.01); *F16C 11/0604* (2013.01); *F16C 11/0623* (2013.01); *F16C 2326/06* (2013.01)

(58) Field of Classification Search
CPC .... B60S 1/24; F16C 11/0604; F16C 11/0623; F16C 2326/09
See application file for complete search history.

(56) References Cited

U.S. PATENT DOCUMENTS

| | | | | |
|---|---|---|---|---|
| 2,309,281 A | * | 1/1943 | Steele | F16C 11/0685 |
| | | | | 403/77 |
| 4,902,157 A | * | 2/1990 | Ishikawa | F16C 11/0666 |
| | | | | 277/504 |

(Continued)

FOREIGN PATENT DOCUMENTS

| | | |
|---|---|---|
| FR | 2648411 A1 | 12/1990 |
| FR | 2764952 A1 | 12/1998 |

OTHER PUBLICATIONS

European Patent Office, International Search Report and Written Opinion for corresponding International Application No. PCT/EP2020/071163, dated Sep. 30, 2020.

*Primary Examiner* — Daniel J Wiley
(74) *Attorney, Agent, or Firm* — Valeo Systemes d'Essuyage

(57) ABSTRACT

The invention concerns a crank pin for a connecting rod of a wiper-actuating linkage system, the crank pin being configured to be received in a complementary inner cavity of a ball joint of the linkage system, and comprising a truncated spherical portion having at least one spherical sector and at least one truncated sector. The invention also concerns a complementary ball joint. The invention also concerns a corresponding linkage system and the method for assembling a connecting rod of such a system.

15 Claims, 5 Drawing Sheets

(56)          References Cited

U.S. PATENT DOCUMENTS 5,002,419 A  *   3/1991  Eustache ................... B60S 1/24
                                                    403/114
6,113,301 A  *   9/2000  Burton ................ F16C 11/0604
                                                    403/348

* cited by examiner

CRANK PIN, BALL JOINT AND CORRESPONDING WIPER ACTUATING LINKAGE SYSTEM AND METHOD FOR THE ASSEMBLY THEREOF

CROSS-REFERENCE TO RELATED APPLICATIONS

This application is filed under 35 U.S.C. § 371 U.S. National Phase of International Application No. PCT/EP2020/071163 filed Jul. 27, 2020 (published as WO2021047812), which claims priority benefit to French application No. 1909902 filed on Sep. 9, 2019, the disclosures of which are herein incorporated by reference in their entirety.

TECHNICAL FIELD

The present invention lies in the field of wiper actuating linkage systems. The present invention relates in particular to a crank pin and a ball joint housing for a connecting rod of such a system. The invention also relates to the method for assembling such a system.

BACKGROUND OF THE INVENTION

A motor vehicle is conventionally equipped with wipers for wiping and washing the windshield and avoiding disruption to the driver's view of his surroundings. These wipers generally comprise an actuating arm of a wiper blade, which effects an angular back-and-forth movement. The wiper blades, which are generally elongate, carry blade rubbers made of a resilient material. In operation, these blade rubbers rub against the windshield and evacuate the water by removing it from the driver's field of view. The actuating arm of each wiper blade is connected, by its opposite end from the blade, to a linkage system in order to be driven in rotation.

BRIEF SUMMARY OF THE INVENTION

Conventionally, a linkage system comprises at least one connecting rod, each longitudinal end of which is articulated to a crank that rotates as one with a drive shaft of a wiper, and more particular the arm thereof.

Each longitudinal end of the connecting rod carries a ball joint housing in which a crank pin is mounted so as to form a connection of the ball joint type. The crank pin is secured to one end of a crank, an opposite end of which is secured to a drive shaft of a wiper.

The ball joint housing internally defines a cavity for mounting at least one portion of the crank pin, which, on the other side, is fixed to the crank.

The crank pin can be force-fitted in the internal cavity of the ball joint housing. It can be held in the cavity by snap-fastening, or with the aid of an additional retaining element, and the ball joint housing can be locked to the connecting rod by carrying out a second movement, for example by locking by way of snap-fastening or with the aid of another additional device. According to these known solutions, the assembly of the connecting rod requires several movements and therefore involves multiple applications of assembly forces to secure the crank pin to the ball joint housing and then to lock the assembly to the connecting rod.

According to another known solution, the ball joint housing can be in the form of two half-housings assembled around the crank pin. The ball joint housing can then be joined to the connecting rod by snap-fastening. The snap-fastening force thus has a dual function of keeping the connecting rod on the ball joint housing and the ball joint housing on the crank pin. However, when the connecting rod is in use, there is a risk of the accidental disassembly of the connecting rod when the forces in the connecting rod are too high.

Moreover, depending on the configuration of the ball joint housing, the assembly of the linkage system on motor vehicle assembly lines may require very specific tooling such as pliers, crimpers for example for crimping the ball joint housing to the crank pin. This additionally requires positioning and also alignment forces for assembling the various parts of the connecting rod of the linkage system. Such an assembly may therefore prove to be complex.

The objective of the invention is to at least partially overcome these drawbacks of the prior art by providing a solution that makes it possible to reduce the assembly forces for such a connecting rod while limiting the risk of accidental disassembly when the connecting rod is in use. A further objective of the invention is to allow simple assembly of the connecting rod, which can be carried out manually without the aid of specific tools, on motor vehicle assembly lines.

To this end, a subject of the invention is a crank pin for a connecting rod of a wiper actuating linkage system, the crank pin being configured to be received in a complementary internal cavity of a ball joint housing of the linkage system. According to the invention, the crank pin has a truncated spherical portion.

In particular, the truncated spherical portion has at least one spherical sector and at least one truncated sector. Said at least one truncated sector is set back with respect to a sphere in which said at least one spherical sector of the truncated spherical portion is inscribed.

Preferably, said at least one truncated sector is realized by a flat. Thus, the truncated spherical portion has at least one spherical sector and at least one flat.

The truncated spherical portion is configured to be fitted in the complementary internal cavity of the ball joint housing with its spherical sector(s) facing an opening portion of the ball joint housing, and then to be turned into a predefined angular assembly position. According to one aspect of the invention, in this position, the spherical sector(s) of the crank pin are intended to each be arranged so as to bear against a facing, preferably spherical, holding portion of the ball joint housing. The truncated sector(s), such as flats, of the crank pin are intended to each be arranged next to an opening portion of the ball joint housing.

During assembly, the truncated spherical portion of the crank pin is intended to engage by sliding with the internal cavity of complementary shape of the ball joint housing so as to form a connection of the ball joint type. This makes it possible to reduce assembly forces.

The crank pin may also have one or more of the following features described below, considered separately or in combination.

According to one exemplary embodiment, the flat(s) of the truncated spherical portion have a circular or bulb-shaped overall shape.

The spherical sector of the truncated spherical portion may extend over an angular sector of less than or equal to 180°.

According to one embodiment, the truncated spherical portion has at least two opposite spherical sectors and at least two opposite truncated sectors. The two opposite truncated sectors are preferably two opposite flats realized on two parallel planes.

According to one aspect of the invention, said at least two spherical sectors of the truncated spherical portion extend respectively over an angular sector of less than or equal to 90°. The angular sector is for example between 30° and 90°, and is preferably around 90°.

According to another aspect, the crank pin has an elongate overall shape along a longitudinal axis. The longitudinal axis may pass through the center of the truncated spherical portion. Alternatively, the truncated spherical portion is not centered on the longitudinal axis of the crank pin.

The crank pin is configured to be joined to the ball joint housing by a translational movement along this longitudinal axis followed by rotation with respect to the ball joint housing, preferably through a quarter turn, about this longitudinal axis, as far as the predefined angular assembly position.

According to one embodiment, the crank pin has at least one cylindrical portion arranged in the axial continuation of said spherical portion.

For example, the crank pin may have at least one truncated cylindrical portion having at least one truncated sector in the continuation of a truncated sector of the truncated spherical portion. In particular, said at least one truncated sector of the truncated cylindrical portion is realized by a flat. Such a flat may be in the continuation of a flat of the truncated spherical portion.

Preferably, the truncated cylindrical portion has at least two truncated sectors, such as two flats, each in the continuation of one of the flats of the truncated spherical portion.

According to one embodiment, the diameter of the, for example truncated, cylindrical portion is less than the diameter of the truncated spherical portion.

The flat(s) on the truncated cylindrical portion have for example a rectangular overall shape.

According to another aspect, two opposite flats of the truncated spherical portion, and optionally of the truncated cylindrical portion, are symmetric with respect to a median plane passing through the center of the truncated spherical portion and containing the longitudinal axis of the crank pin. This makes mounting in both directions easier.

Alternatively, it is possible for the flats not to be symmetric. This makes it possible to mistake-proof the direction of mounting of the connecting rod.

According to yet another aspect, the crank pin has a first longitudinal end portion and a second longitudinal end portion, the truncated spherical portion being situated axially between the first and second longitudinal end portions.

One of the longitudinal end portions, for example the first one, ensures a function of preventing a connecting rod intended to receive the crank pin from rotating with respect to the crank pin.

It is possible for the longitudinal end portions not to be truncated, in particular not to have flats. According to one example, the end portions have a cylindrical overall shape.

In a variant, at least one of the longitudinal end portions, for example the second longitudinal end portion, or both of them, may be truncated and have at least one flat.

According to one particular embodiment variant, the crank pin has a cylindrical portion arranged in the axial continuation of the truncated spherical portion, which is not truncated. It may be for example an intermediate cylindrical portion situated axially between the truncated spherical portion and a longitudinal end portion.

The truncated spherical portion may have a diameter greater than the diameter of the first longitudinal end portion and than the diameter of the second longitudinal end portion.

The crank pin is configured to be joined on one side to a connecting rod of the linkage system having the ball joint housing, and on the other side to another component of the linkage system, such as a crank.

The invention also relates to a ball joint housing for a connecting rod of a wiper actuating linkage system, the ball joint housing having an internal cavity configured to receive a complementary crank pin as defined above. The internal cavity has at least one first, holding portion for holding the crank pin and at least one second, opening portion that increases a dimension of the internal cavity.

The ball joint housing may also have one or more of the following features described below, considered separately or in combination.

Said at least one first portion may define a spherical portion.

According to one embodiment, the internal cavity has at least two opposite first, holding portions and at least two opposite second, opening portions such that the maximum distance between the two second portions is greater than the maximum distance between the two first portions.

This configuration of the ball joint housing makes it easier to mount the crank pin in the internal cavity of the ball joint housing by disposing the or each spherical sector of the truncated spherical portion at a second, opening portion. The insertion may advantageously be effected along a fitting axis coincident with the longitudinal axis of the crank pin. The crank pin can then be moved by a rotational movement until the or each spherical sector of the crank pin faces and bears against a first, preferably spherical, holding portion of the internal cavity. In addition, the internal surfaces of the second, opening portion(s) may engage with the flat(s) of the crank pin to prevent it from rotating in the ball joint housing.

The internal surface of the second, opening portion(s) may be rectilinear or curved.

According to another aspect, the ball joint housing has an elongate overall shape along a longitudinal axis passing through the center of the internal cavity.

According to one embodiment, the internal cavity of the ball joint housing has a cavity bottom of cylindrical overall shape centered on the longitudinal axis of the ball joint housing.

According to one aspect, the bottom of the cavity is configured to receive a, for example cylindrical, longitudinal end portion of the crank pin.

The diameter of the bottom of the cylindrical cavity may be less than the maximum distance between two opposite first, holding portions.

According to one embodiment, the ball joint housing is overmolded on a connecting rod of the linkage system.

The ball joint housing is made for example of plastics material.

The present invention also relates to a wiper actuating linkage system having at least one connecting rod that has an elongate overall shape. Said at least one connecting rod has, at one longitudinal end, a ball joint housing as defined above and receiving a crank pin as described above, in a predefined angular assembly position. In this position, said at least one spherical sector of the truncated spherical portion of the crank pin is arranged so as to bear against said at least one facing first, holding portion of the ball joint housing.

Advantageously, with one or more spherical first, holding portions of the ball joint housing, the shape cooperation between the crank pin and the ball joint housing makes it possible to better transmit to the crank pin the forces to which the connecting rod is subjected in operation.

According to one aspect of the invention, the diameter of the truncated spherical portion of the crank pin is less than the maximum distance between two first, holding portions of the ball joint housing.

According to another aspect, the or each spherical first, holding portion of the ball joint housing extends over an angular sector smaller than that of a spherical sector of the truncated spherical portion of the crank pin.

In the predefined assembly position, the crank pin is prevented from rotating with respect to the ball joint housing. The crank pin may have at least one edge corner at the intersection of a spherical sector and a flat of the truncated spherical portion that is able to come into abutment against an internal surface of a second, opening portion of the ball joint housing.

According to yet another aspect, the length of the internal cavity of the ball joint housing is less than the length of the crank pin.

Lastly, the invention relates to a method for assembling a connecting rod of the linkage system as described above, the connecting rod having a ball joint housing at one longitudinal end. The method comprises the following steps:

inserting the crank pin into the internal cavity of the ball joint housing carried by the connecting rod by way of a relative translational movement, such that said at least one spherical sector of the truncated spherical portion of the crank pin is arranged next to a second, opening portion of the internal cavity of the ball joint housing, and such that said at least one truncated sector, such as a flat, of the truncated spherical portion of the crank pin is arranged next to a first, holding portion of the internal cavity of the ball joint housing, and carrying out a relative rotational movement between the crank pin and the ball joint housing, as far as a predefined angular assembly position in which said at least one spherical sector of the truncated spherical portion of the crank pin is next to a first, holding portion of the internal cavity of the ball joint housing.

The rotation is for example a quarter turn.

Thus, it is possible to have easy assembly of the connecting rod, in particular by production operators of a motor vehicle manufacturer, with no specific tool being required. The driving in rotation as far as the predefined angular assembly position is carried out with minimum forces.

According to one aspect of the invention, the ball joint housing is made directly on the connecting rod by being overmolded at an orifice at one longitudinal end of the connecting rod.

The method may include a step of fixing, for example by screwing, the crank pin to a component of the linkage system, such as a crank. The crank pin may be fixed to the connecting rod by its longitudinal end portion that is not intended to be surrounded by the ball joint housing on assembly.

BRIEF DESCRIPTION OF THE DRAWINGS

Further advantages and features of the invention will become more clearly apparent from reading the following description, given by way of illustrative and nonlimiting example, and the appended drawings, in which.

In these figures, identical elements bear the same reference numerals.

DETAILED DESCRIPTION OF THE INVENTION

The following embodiments are examples. Although the description refers to one or more embodiments, this does not necessarily mean that each reference relates to the same embodiment, or that the features apply only to a single embodiment. Individual features of different embodiments may also be combined or interchanged in order to create other embodiments.

In the description, certain elements may be indexed, such as first element or second element, for example. In this case, this is a simple index for differentiating and denoting elements that are similar but not identical. This indexing does not imply that one element takes priority over another and such denominations can easily be interchanged without departing from the scope of the present description. This indexation does not imply an order in time either.

Figure 1:
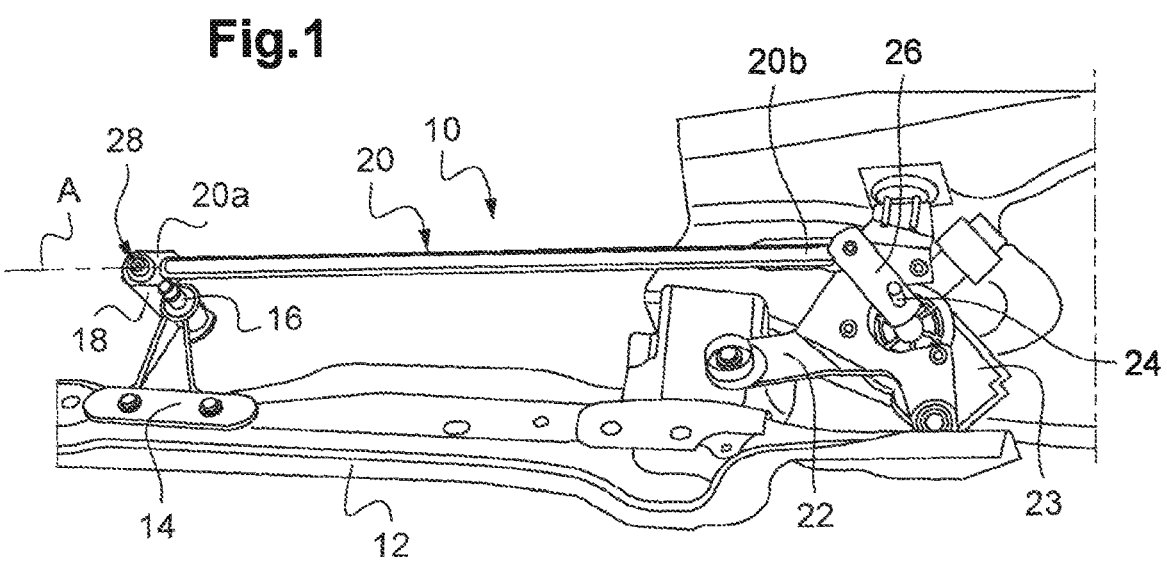
FIG. 1 is a schematic perspective view of a wiper actuating linkage system of a motor vehicle.

Reference is first of all made to FIG. 1, which shows a wiper actuating linkage system 10 of a motor vehicle, referred to as system 10 below. In the state mounted in a motor vehicle, the system 10 is typically fixed to the body 12 of the vehicle.

The system 10 comprises a mounting plate 14 for supporting a bearing for guiding the rotation of a drive shaft 16 of a first wiper (not shown). This first wiper comprises conventionally an actuating arm of a wiper blade (not shown). One longitudinal end of the driving arm is secured to the drive shaft 16 and its opposite longitudinal end is connected to the wiper blade. The wiper blade carries a blade rubber intended to wipe the windshield of the vehicle.

The system 10 also comprises a crank 18 and a connecting rod 20. The connecting rod 20 has a substantially rectilinear elongate overall shape extending along an elongation axis A between a first longitudinal end 20a and a second longitudinal end 20b. One end of the crank 18 rotates as one with the drive shaft 16 of the first wiper. The other end of the crank 18 is articulated to the first longitudinal end 20a of the connecting rod 20. The connecting rod 20 is produced for example by pressing a metal sheet.

The system 10 comprises another mounting plate 22 for supporting an electric geared motor 23, the output shaft 24 of which is intended to drive a second wiper (not shown). This second wiper, which is not shown, is similar to the one described above.

The system 10 has another crank 26, one end of which rotates as one with the output shaft 24. The other end of the crank 26 is articulated to the second longitudinal end 20*b* of the connecting rod 20.

Figure 2:
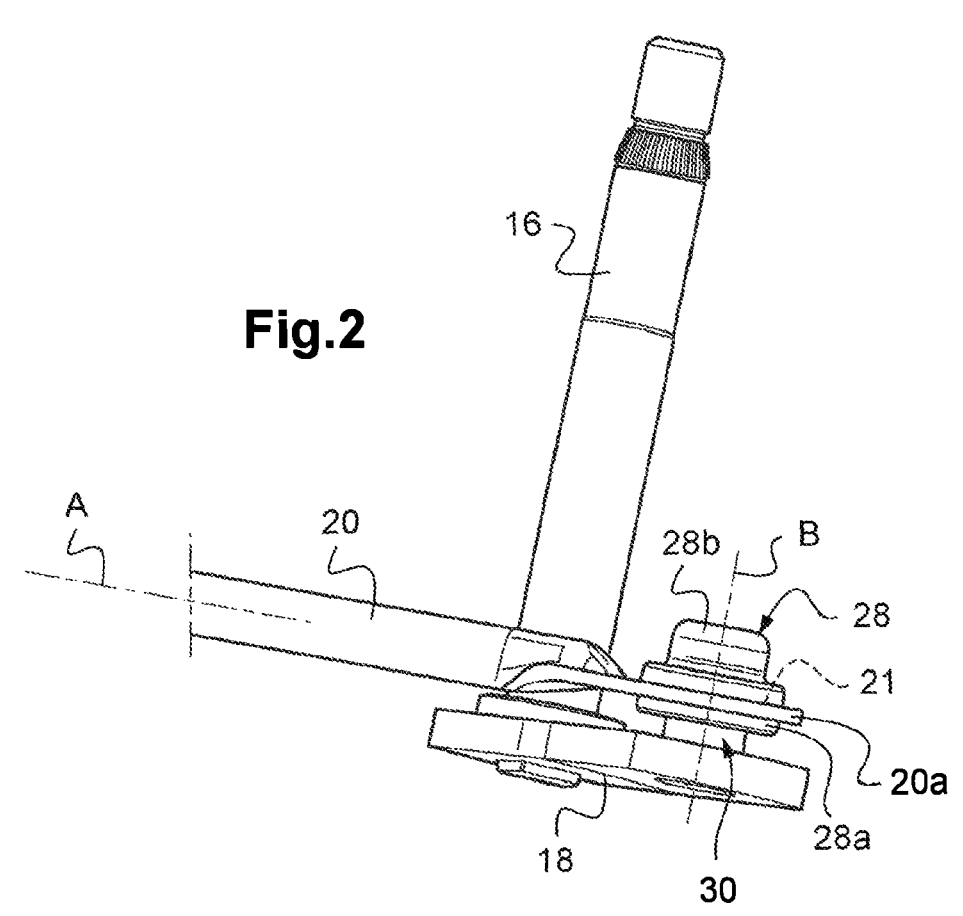
FIG. 2 is a view on a larger scale of a part of the linkage system in FIG. 1.

Each longitudinal end 20*a*, 20*b* of the connecting rod 20 is articulated to the corresponding crank 18, 26 via a receptacle referred to as a ball joint housing 28, more clearly visible in FIG. 2, and a corresponding crank pin 30.

The crank pin 30 is designed to be received at least partially in a complementary internal cavity of the ball joint housing 28, so as to form a connection of the ball joint type. The connection between the crank pin 30 and the ball joint housing 28 ensures the articulation between the connecting rod 20 and the corresponding crank, for example 18. Thus, the crank pin is intended to be joined on one side to a connecting rod 20 of the linkage system having the ball joint housing 28, and on the other side to another component of the linkage system, such as the crank 18.

Figure 3:
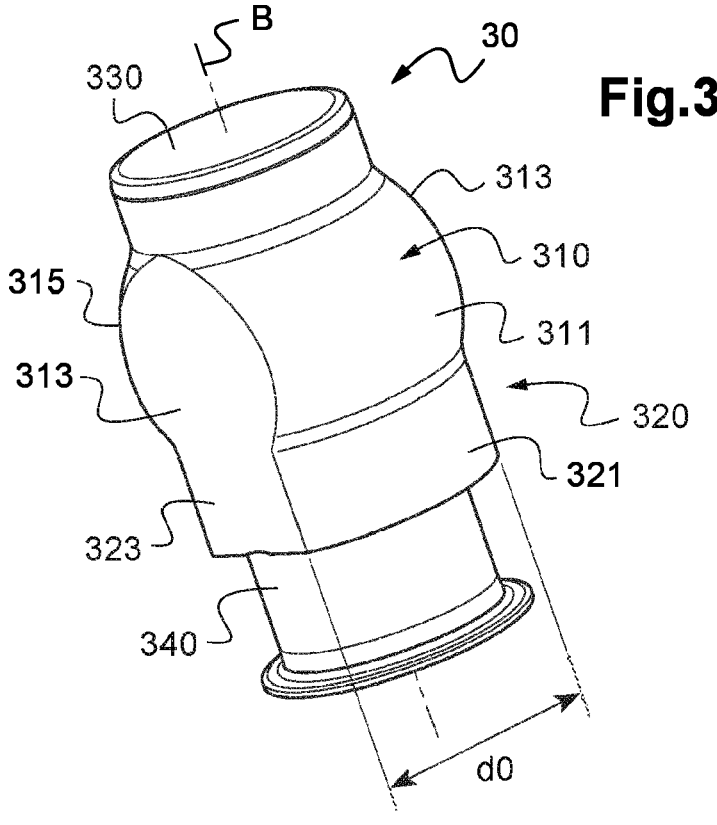
FIG. 3 is a first perspective view of a crank pin of a connecting rod of the linkage system in FIGS. 1 and 2.
Figure 4:
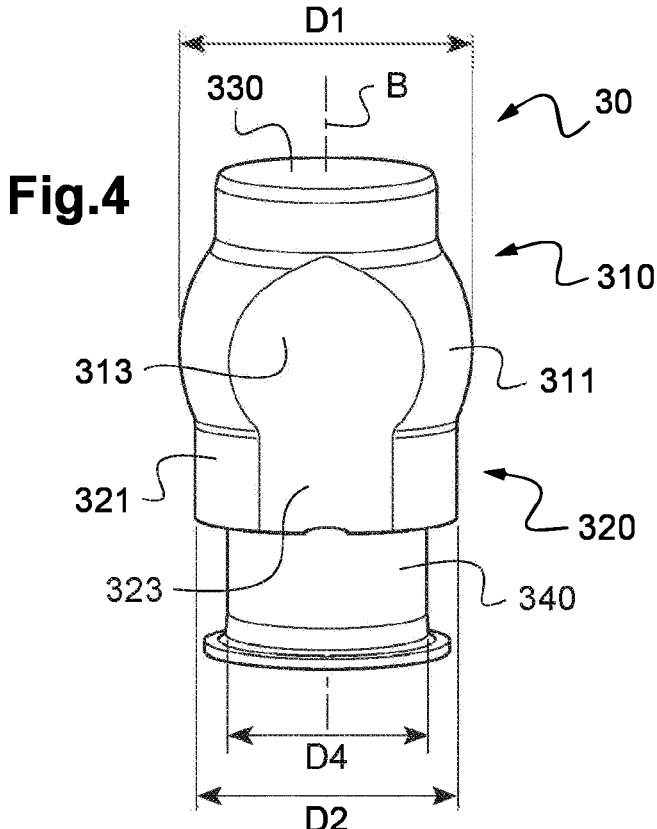
FIG. 4 is a second perspective view of the crank pin in FIG. 3.

With reference to FIGS. 3 and 4, the crank pin 20 will be described in more detail below.

According to the embodiment described, the crank pin 30 has an elongate overall shape along a longitudinal axis B.

The crank pin 30 comprises a truncated spherical portion 310. This truncated spherical portion 310 is intended to be housed at least partially in the corresponding ball joint housing carried by the connecting rod (these not being visible in FIGS. 3 and 4).

According to the embodiment described, the truncated spherical portion 310 is centered on the longitudinal axis B of the crank pin 30.

According to an embodiment variant that is not shown, it is possible for the truncated spherical portion not to be centered on the longitudinal axis B. Such a configuration makes it possible for example to mistake-proof the direction of mounting of the connecting rod, in particular between the ends of the connecting rod.

The truncated spherical portion 310 has at least one spherical sector and at least one truncated sector. Such a truncated sector may be formed by a flat. The flat may be realized on a plane parallel to the longitudinal axis B of the crank pin 30. The spherical portion is therefore truncated along the plane of such a flat. In other words, the diameter of the truncated spherical portion 310 is reduced in the truncated sector, such as a flat. In addition, the flat may have a circular or bulb-shaped overall shape.

According to an embodiment that is not shown, the truncated spherical portion 310 may have one truncated sector, such as a flat. The truncated spherical sector 310 may have a D-shaped or substantially D-shaped overall shape. In this case, the spherical sector of the truncated spherical portion 310 may extend over an angular sector of less than or equal to 180°.

Furthermore, the truncated spherical portion 310 has as many spherical sectors as it has truncated sectors, such as flats.

In particular, the truncated spherical portion 310 may have at least two opposite spherical sectors and at least two opposite truncated sectors. The opposite truncated sectors are for example opposite flats realized on two parallel planes. The truncated spherical portion 310 is thus segmented.

In the nonlimiting example illustrated in FIGS. 3 and 4, the truncated spherical portion 310 has two opposite spherical sectors 311 and two opposite truncated sectors 313, such as opposite flats 313 realized on two parallel planes. In cross section, the spherical portion 310 has two diametrically opposite borders, which are rectilinear and parallel, and two other diametrically opposite borders which are curved.

The angular coverage of the spherical sectors 311 of the truncated spherical portion 310 is advantageously chosen to limit the risk of accidental disassembly of the connecting rod (not visible in FIGS. 3 and 4). In this example, the two spherical sectors 311 of the truncated spherical portion 310 extend respectively over an angular sector that may be as much as 90°, for example between 30° and 90°, preferably around 90°.

In addition, the truncated spherical portion 310 has a maximum diameter D1 between the two spherical sectors 311 that is greater than the maximum distance do between the two truncated sectors such as the flats 313 of the truncated spherical portion 310.

As regards the flats 313, they have for example a circular or bulb-shaped overall shape. The parallel planes of the two flats 313 are also parallel to a median plane passing through the center of the truncated spherical portion 310 and containing the longitudinal axis B of the crank pin 30. The spherical portion 310 is therefore truncated on these two parallel planes. This makes it in particular easier to mount the crank pin 30 in the corresponding ball joint housing in both directions.

According to one option, the edge corners 315 of the crank pin at the intersection of a spherical sector 311 and a flat 313 may be intended to come into abutment against an internal surface of the ball joint housing intended to receive the crank pin 30.

The crank pin 30 may also have a truncated cylindrical portion 320. The latter is arranged in the axial continuation of the truncated spherical portion 310. The truncated portions 310 and 320 are concentric.

In a similar manner to the truncated spherical portion 310, the truncated cylindrical portion 320 may have at least one truncated sector, in particular a flat in the continuation of a truncated sector such as a flat of the truncated spherical portion 310 and at least one cylindrical sector in the axial continuation of a spherical sector of the truncated spherical portion 310.

According to the embodiment illustrated in FIGS. 3 and 4, the truncated cylindrical portion 320 has two opposite cylindrical sectors 321. The two cylindrical sectors 321 are arranged in the axial continuation of the spherical sectors 311. These cylindrical sectors 321 extend over one and the same angular coverage as the spherical sectors 311.

The truncated cylindrical portion 320 also has two flats 323 in the continuation of the flats 313 of the truncated spherical portion 310. The two flats 323 are therefore realized in the truncated cylindrical portion 320 on the two parallel planes of the flats 313 of the truncated spherical portion 310.

According to an alternative that is not shown, it is possible for the cylindrical portion 320 not to be truncated. In other words, it may be free of flats 323.

The flat 323 on the truncated cylindrical portion 320 have for example a rectangular overall shape. The flats 313, 323 on one and the same side of the crank pin 30 have, according to the embodiment illustrated, a rectangular part (corresponding to the flat 323 on the truncated cylindrical portion 320) and a bulb-like part (corresponding to the flat 313 on the truncated spherical portion 310), the contour of which is formed by two circular arcs that meet at a pointed shape on the opposite side from the rectangular part.

Furthermore, the truncated cylindrical portion 320 has a maximum diameter D2 between the two cylindrical sectors 321 that is greater than the maximum distance do between the truncated sectors such as the flats 323 of the truncated cylindrical portion 320. The diameter D2 of the truncated cylindrical portion 320 is for example less than the diameter D1 of the truncated spherical portion 310 between the spherical sectors 311.

Moreover, the crank pin 30 may have a first longitudinal end portion 330 and a second longitudinal end portion 340. The truncated spherical portion 310 is situated axially between the first 330 and second 340 longitudinal end portions. One of the longitudinal end portions, for example the first one 330, ensures a function of preventing a corresponding connecting rod (not shown in FIGS. 3 and 4) from rotating with respect to the crank pin 30.

It is possible for the longitudinal end portions 330, 340 not to be truncated, and to be free of flats for example, as illustrated in FIGS. 3 and 4.

According to one example, the longitudinal end portions 330, 340 respectively have a cylindrical overall shape. The truncated spherical portion 310 and the longitudinal end portions 330, 340 are concentric in this example. The diameter of the first longitudinal end portion 330 is not referenced in FIGS. 3 and 4, and the second longitudinal end portion 340 has a diameter D4 schematically indicated in FIG. 4.

The diameter D1 of the truncated spherical portion 310 is greater than the diameter of the first longitudinal end portion 330 and optionally than the diameter D4 of the second longitudinal end portion 340.

According to an embodiment variant that is not shown, one or more flats may be provided on the second longitudinal end portion 340, making it possible to mistake-proof the orientation of the crank pin on the crank during assembly.

According to the embodiment with a truncated cylindrical portion 320, it may be arranged axially between the truncated spherical portion 310 and one of the longitudinal end portions, the second longitudinal end portion 340 in the example illustrated. According to the variant in which the cylindrical portion 320 is not truncated, this is an intermediate cylindrical portion between the truncated spherical portion 310 and the second longitudinal end portion 340.

By way of example, the truncated cylindrical portion 320 and the second longitudinal end portion 340 may not be intended to be received inside the corresponding ball joint housing in the assembled state of the connecting rod.

Figure 5:
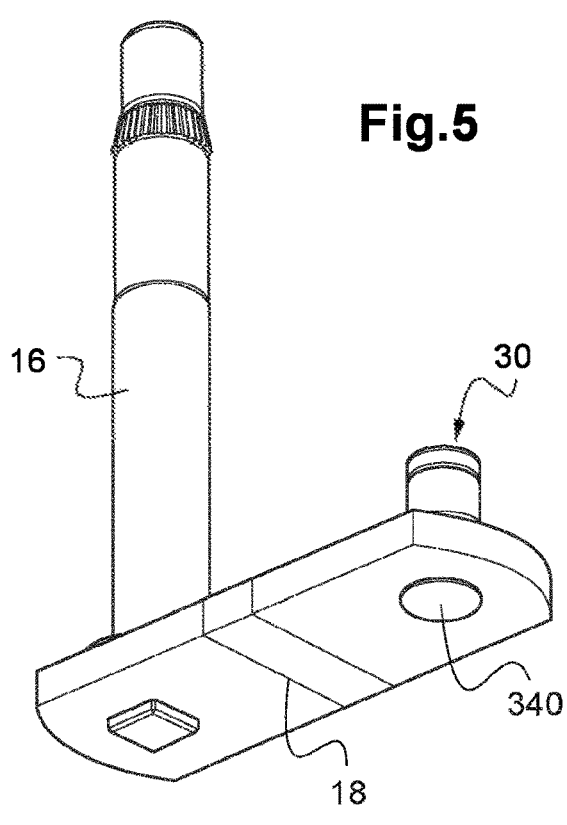
FIG. 5 is a bottom view of a crank of the linkage system, said crank being assembled on the crank pin in FIGS. 3 and 4.

The crank pin 30 is shown in FIG. 5 in its state joined to a corresponding crank, for example the crank 18. To this end, the crank pin 30 advantageously has a portion for connecting to a corresponding crank, for example the crank 18. This connecting portion is formed for example by the second longitudinal end portion 340. It may be a portion for fixing, for example by crimping, to one end of the corresponding crank 18.

With reference again to FIG. 2, the latter shows the crank pin 30 and the ball joint housing 28 which is used for mounting it at one longitudinal end, for example 20a, of the connecting rod 20. The ball joint housing 28 will be described in more detail below.

The ball joint housing 28 may in particular be made of plastics material.

It is intended to be mounted at an orifice 21 at one longitudinal end, for example 20a, of the connecting rod 20.

According to one embodiment variant, the ball joint housing 28 is produced directly by overmolding at the orifice in the connecting rod 20.

In a general manner, the ball joint housing 28 has an elongate shape extending along a longitudinal axis which is coincident with the longitudinal axis B of the crank pin 30 when it is received in the ball joint housing 28.

By way of example, the ball joint housing 28 may have a first part or lower part 28a and a second part or upper part 28b. The terms lower and upper are defined here with reference to the orientation of the elements in FIG. 2. The parts 28a, 28b of the ball joint housing 28 are axially aligned.

According to the particular embodiment illustrated, the ball joint housing 28 may be substantially hat-shaped or bell-shaped. The upper part 28b is domed for example in a nonlimiting manner. Any other shape may be envisioned. For example, the upper part 28b may have an open cylindrical overall shape.

Figure 6:
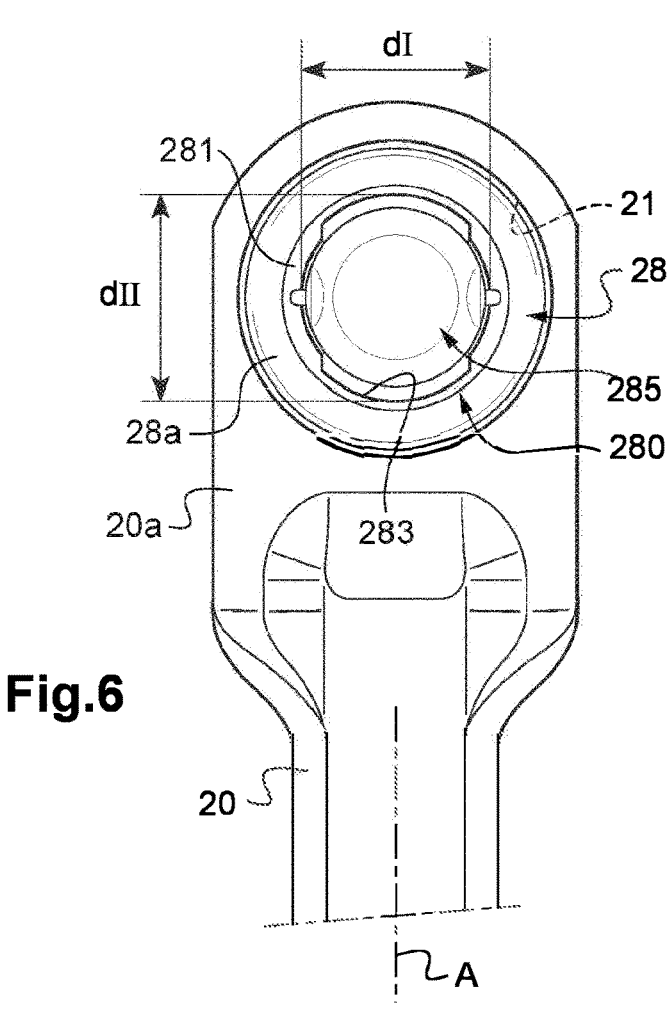
FIG. 6 is a partial perspective view of a connecting rod having a ball joint housing capable of accommodating the crank pin in FIGS. 3 and 4.
Figures 7, 8, 9:
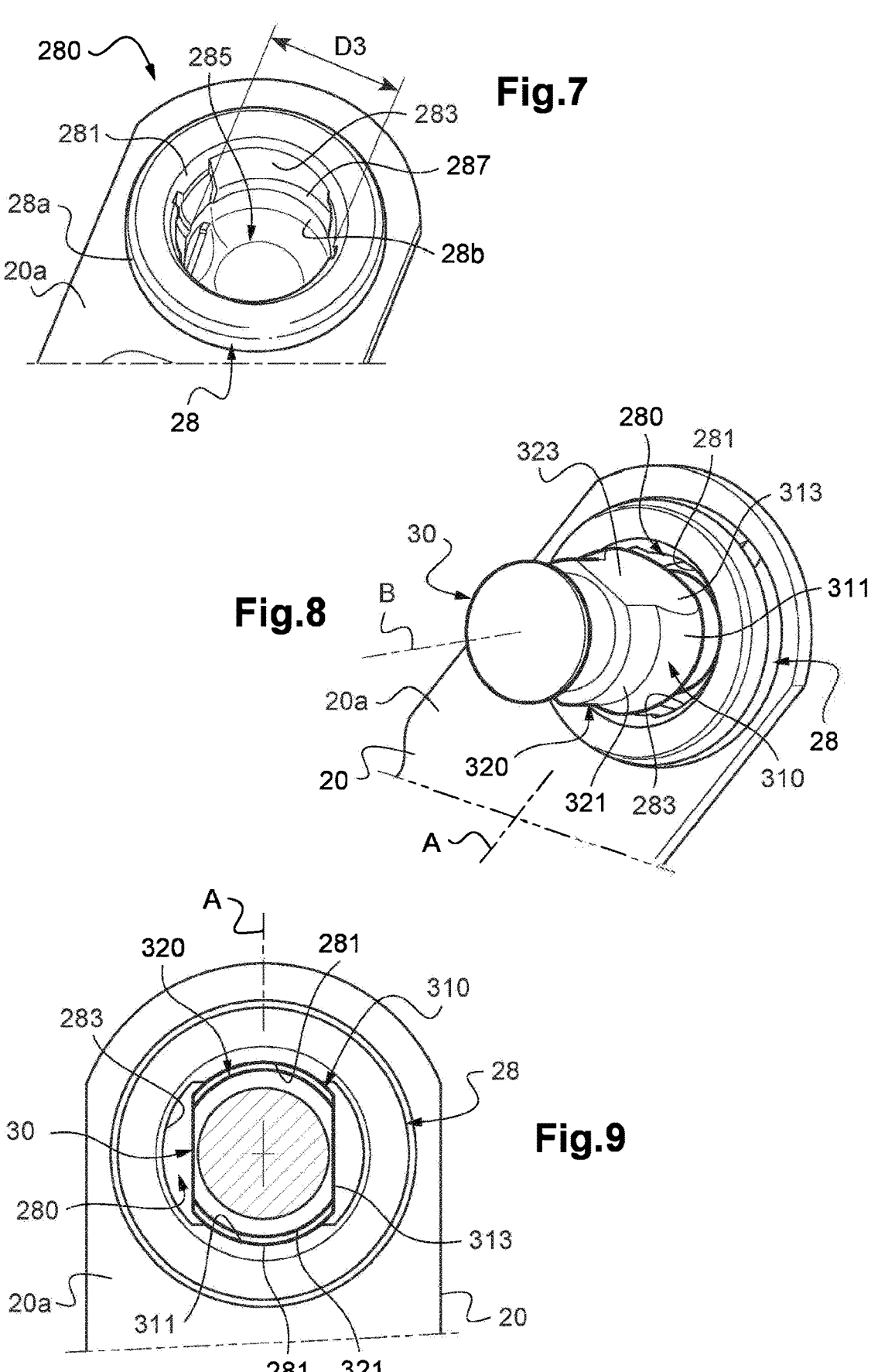
FIG. 7 is an enlarged view of one end of the connecting rod in FIG. 6 carrying the ball joint housing.
FIG. 8 shows the crank pin from FIGS. 3 and 4 in a position fitted in the ball joint housing during the assembly of the connecting rod in FIGS. 6 and 7.
FIG. 9 shows the crank pin received in the ball joint housing in an angular assembly position after rotation.

The ball joint housing 28 defines an internal cavity 280, which is visible in FIGS. 6 and 7. The internal cavity 280 is intended to at least partially receive the complementary crank pin (not shown in FIGS. 6 and 7) as described above. The internal cavity 280 is designed to allow the insertion of such a complementary crank pin into the internal cavity 280 and to allow the crank pin to be held in the ball joint housing in the assembled state of the connecting rod.

According to the embodiment described, the internal cavity 280 is centered on the longitudinal axis of the ball joint housing.

The internal cavity 280 leads out or is open at an axial end of the ball joint housing 28. This provides access for inserting the crank pin into the ball joint housing 28.

Alternatively, the ball joint housing 28 may be open on both sides. In other words, it is possible for the upper part 28b of the ball joint housing 28 not to be closed but also to be open. The internal cavity 280 may lead out on both sides.

The length of the internal cavity 280 of the ball joint housing is for example less than the total length of the crank pin, such that the ball joint housing 28 is intended to extend around the crank pin, leaving free at least a portion of the crank pin, for example the truncated cylindrical portion and one of the longitudinal end portions of the crank pin, such as the second longitudinal end portion.

The internal cavity 280 of the ball joint housing 28 is intended to receive at least the truncated spherical portion of the crank pin so as to form a connection of the ball joint type.

In a complementary manner to the truncated spherical portion of the crank pin, the internal cavity 280 has at least one portion with a substantially spherical overall shape. The axis of revolution of the internal cavity 280 corresponds to the longitudinal axis of the ball joint housing 28.

In particular, the internal cavity 280 has at least one first, holding portion 281 against which the crank pin is intended to bear when the connecting pin is assembled. This holding portion 281 is internally defined for example by the lower part 28a of the ball joint housing 28.

The holding portion 281 preferably defines a shape complementary to the shape of a spherical sector of the crank pin that the ball joint housing 28 is intended to receive. The holding portion 281 is, in this example, a spherical or substantially spherical portion.

In addition, the internal cavity 280 has at least one second, opening portion 283 that makes it possible to enlarge a dimension of the internal cavity 280. Such a second, opening portion 283 is obtained for example by making a cutout in the ball joint housing.

In a manner complementary to the crank pin 30, the internal cavity 280 of the ball joint housing 28 has as many holding portions 281 as the complementary crank pin has spherical sectors. Each first, holding portion 281 extends over an angular sector smaller than that of a complementary spherical sector of the truncated spherical portion of the crank pin.

According to the embodiment illustrated in FIGS. 6 and 7, the internal cavity 280 has two opposite first, holding portions 281 and two opposite second, opening portions 283. The two second, opening portions 283 may be obtained by way of cutouts made oppositely in the ball joint housing 28 in order to radially increase the size of the internal cavity 280. The shape of the ball joint housing is obtained for example directly by plastic injection molding without subsequent reworking.

The two opposite first, holding portions 281 are spaced apart from one another by a maximum distance, referred to as first maximum distance dI, corresponding to the diameter of a sphere in which the two first, holding portions 281 are inscribed. This first maximum distance dI is greater, more specifically slightly greater, to avoid excessive play, than the diameter of the truncated spherical portion of the crank pin between its spherical sectors. The expression "slightly greater" means a non-zero but very small spacing, in particular less than or equal to 0.2 mm or 0.3 mm. The first maximum distance dI is chosen such that the opposite first, holding portions 281 can hold the spherical sectors of the crank pin in the assembled state of the connecting rod.

The two second, opening portions 283 are spaced apart by a maximum distance, referred to as second maximum distance dII, which is greater than the first maximum distance dI between the opposite first, holding portions 281. This second maximum distance dII is chosen to be sufficient to make it possible to mount the crank pin in the internal cavity 280 without generating forces and without specific tools, by placing the spherical sectors of its truncated spherical portion such that they are next to the second, opening portions 283. With reference again to FIGS. 3 and 4, the second maximum distance dII is strictly greater than the maximum distance do between the two truncated sectors such as the flats 313 of the truncated spherical portion 310. The second maximum distance dII is also greater than the diameter D1 of the truncated spherical portion 310.

Furthermore, the internal surface of the second, opening portions 283 may be rectilinear or curved as in the example illustrated.

In addition, the second, opening portions 283 may engage with the flats of the crank pin, or more specifically with the edge corners of the crank pin at the intersection of a spherical sector and a flat, in order to prevent the rotation of the crank pin in the ball joint housing 28.

The internal cavity 280 may additionally have a cavity bottom 285. The cavity bottom 285 is, in this example, internally defined by the upper part 28b of the ball joint housing 28. According to the particular embodiment illustrated, the axial end of the cavity bottom 285 on the opposite side from the holding portion 281 is closed. Alternatively, it is possible for the portion 285 internally defined by the upper part 28b not to have a bottom wall.

The interior portion of the upper part 28b, for example a cavity bottom 285, is advantageously configured to receive a longitudinal end portion of the crank pin, for example the first, and has a shape complementary to the latter. In this example, the interior portion or cavity bottom 285 has a cylindrical overall shape centered on the longitudinal axis of the ball joint housing 28.

The cylindrical interior portion or cavity bottom 285 has a diameter D3 greater than the diameter of the first longitudinal end portion of the crank pin. This diameter D3 is for example less than the first maximum distance dI between the two opposite first, holding portions 281.

Furthermore, the internal cavity 280 has, as in the example illustrated, at least one shoulder 287 between a second, opening portion 283 and the bottom of the cavity 285.

Thus, the crank pin 30 in FIGS. 3 to 5 can be mounted in the ball joint housing 28 in FIGS. 6 and 7.

The second, opening portion(s) 283 make it easier to insert the crank pin 30 into the internal cavity 280 by positioning the crank pin 30 such that, by fitting in the internal cavity 280 of the ball joint housing 28, the spherical sector(s) 311 of the truncated spherical portion 310 are inserted next to a corresponding second, opening portion 283 of the internal cavity 280, as schematically shown in FIG. 8. In this case, the truncated sector(s) such as flats 313 fit in the internal cavity 280 so as to face one or the first, holding portion 281 of the internal cavity 280. The crank pin 30 may advantageously be inserted along the longitudinal axis B of the crank pin 30.

At the end of assembly, for example following a relative rotational movement between the ball joint housing 28 and the crank pin 30, about the longitudinal axis B, the spherical sector(s) 311 of the crank pin 30 are arranged next to and so as to bear against the first, holding portions 281 of the internal cavity 280 in a predefined angular assembly position shown in FIG. 9. In such a position, the truncated sector(s) such as flats 313 of the crank pin 30 are arranged next to the second, opening portions 283. The edge corners at the intersection of a spherical sector 311 and a flat 313 of the truncated spherical portion 310 of the crank pin may come to bear against a second, opening portion 283 of the ball joint housing 28.

Figure 10:
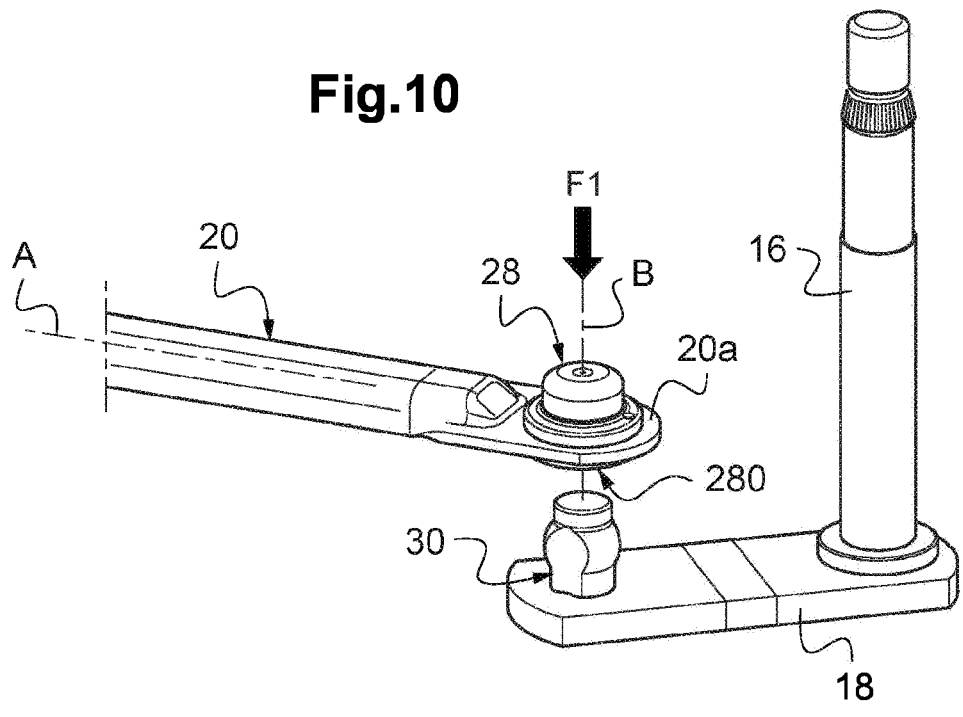
FIG. 10 is an exploded view of the connecting rod in FIG. 2 before the crank pin is inserted into the ball joint housing.
Figure 11:
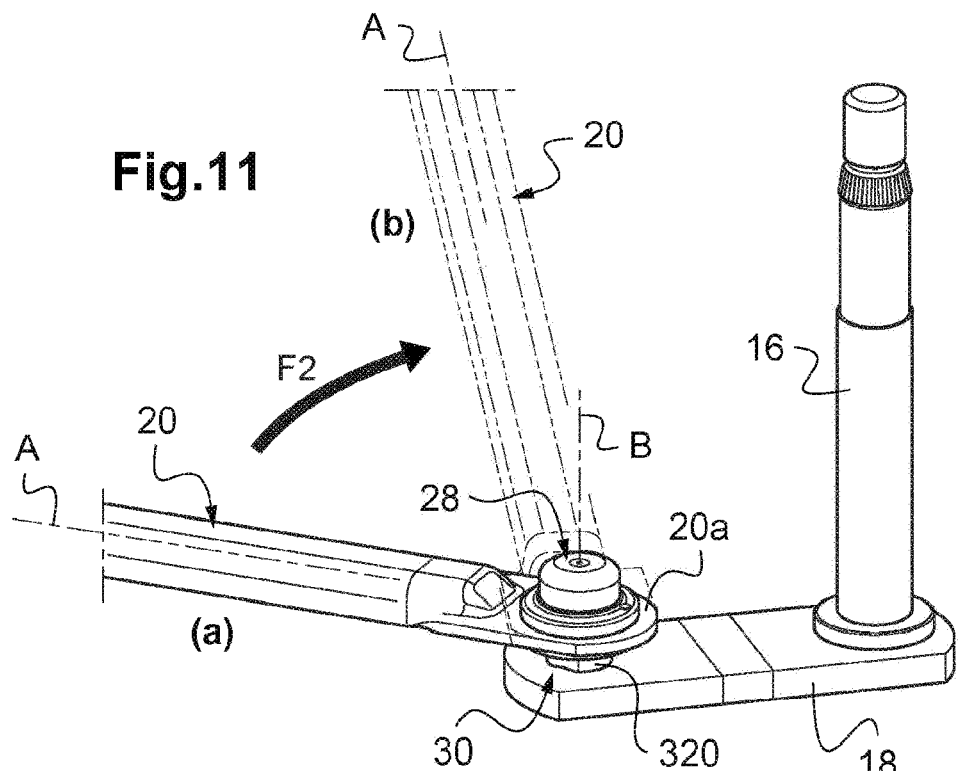
FIG. 11 shows the position of the connecting rod carrying the ball joint housing with respect to the crank carrying the crank pin before and after rotation.

FIGS. 10 and 11 show steps in the mounting of a connecting rod 20 of the linkage system 10 in FIG. 1.

The method for assembling the connecting rod 20 may comprise a step for fitting the ball joint housing 28 at a longitudinal end 20a of the connecting rod 20. The ball joint housing 28 is advantageously formed directly on the connecting rod 20 by being overmolded at an orifice at one longitudinal end 20a of the connecting rod 20.

The method may include a step of fixing, for example by screwing, crimping or the like, the crank pin 30 to a component of the linkage system, such as a crank 18. The crank pin 30 may be fixed to the connecting rod by its longitudinal end portion, for example the second one, that is not intended to be surrounded by the ball joint housing 28 on assembly.

The assembly method includes a step of inserting the crank pin 30 into the internal cavity of the ball joint housing 28 carried by the connecting rod 20 by way of a relative translational movement, as schematically shown in FIG. 10.

The translational movement takes place along a fitting axis coincident with the longitudinal axis B, as schematically indicated by the arrow F1. The direction of the translational movement schematically indicated by the arrow F1 is not limiting. The translational movement may, of course, take place in the other direction.

The crank pin 30 fits axially in the ball joint housing 28 such that its truncated spherical portion is housed in the internal cavity 280 of the ball joint housing 28. The crank pin 30 engages by sliding with the ball joint housing 28. At the end of the translational movement, the crank pin 30 is fitted in the ball joint housing 28 in a position (a) indicated by solid lines in FIG. 11. As described with reference to FIG. 8, the insertion is easier since the spherical sector(s) 311 of the truncated spherical portion 310 of the crank pin 30 fit in the internal cavity 280 at a larger part defined by the second, opening portion(s) 283. With reference again to FIG. 11, the ball joint housing 28 extends around the crank pin 30, leaving the truncated cylindrical portion 320 of the crank pin 30 free. The first longitudinal end portion of the crank pin 30 is received in the cavity bottom of the ball joint housing 28. For its part, the second longitudinal end portion of the crank pin 30 is joined to the crank 18.

Subsequently, by way of a relative rotational movement between the crank pin 30 and the ball joint housing 28, as schematically indicated by the arrow F2, the assembly made up of the crank pin 30 and ball joint housing 28 passes from the position (a) at the end of the translational movement to a predefined angular assembly position (b) indicated by broken lines in FIG. 11. This is, in particular, a quarter turn rotation. In the predefined angular assembly position (b), the spherical sector(s) 311 of the truncated spherical portion 310 are next to the first, holding portion(s) 281 of the ball joint housing 28, as described with reference to FIG. 9.

Thus, it is possible to have easy assembly of the connecting rod 20, with no specific tool being required. The assembly by translational movement followed by rotation into the predefined angular assembly position (b) is carried out with minimum forces on account of the sliding between the external surface of the crank pin 30 and the internal surface of the ball joint housing 28. This assembly can be carried out by an operator on a motor vehicle manufacturer assembly line, for example when they receive a linkage system made up of separate parts.

In the predefined angular assembly position (b), the engagement of the spherical sectors 311 of the crank pin 30 and the, advantageously spherical, holding portions 281 of the ball joint housing 28 ensure effective transmission of the forces when the connecting rod 20 is in use.

Finally, the engagement between the edge corners 315 of the crank pin 30, at the intersection of the flats 313 with the spherical sectors 311, and the internal surfaces of the ball joint housing 28 makes it possible to obtain effective locking of the crank pin in the predefined assembly position, limiting the risk of the crank pin 30 being free to rotate with respect to the ball joint housing 28.

What is claimed is:

1. A crank pin of a wiper linkage system, comprising:
a connecting rod associated with the crank pin;
the crank pin being configured to be received in a complementary internal cavity of a ball joint housing of the wiper linkage system, wherein a truncated spherical portion has a spherical sector and a truncated sector, and
the crank pin having opposing cylindrical ends with a first longitudinal end portion and a second longitudinal end portion, where the truncated spherical portion is situated axially between the opposing ends of the first longitudinal end portion and the second longitudinal end portion.

2. The crank pin of claim 1, wherein the truncated sector is realized by a flat feature.

3. The crank pin of claim 2, wherein the truncated spherical portion has:
at least two opposite spherical sectors and
at least two opposite flats realized on two parallel planes.

4. The crank pin of claim 3, wherein the at least two spherical sectors of the truncated spherical portion extend respectively over an angular sector of less than or equal to 90°.

5. The crank pin of claim 3, wherein the crank pin has an elongate overall shape along a longitudinal axis passing through a center of the truncated spherical portion, wherein two opposite flats are symmetric with respect to a median plane passing through the center of the truncated spherical portion and containing the longitudinal axis (B) of the crank pin.

6. The crank pin of claim 1, having an elongate overall shape along a longitudinal axis (B) passing through a center of the truncated spherical portion.

7. The crank pin of claim 6, having a truncated cylindrical portion which is arranged in the axial continuation of the spherical portion and has a truncated sector in the continuation of a truncated sector of the truncated spherical portion.

8. The crank pin of claim 6, having a first longitudinal end portion and a second longitudinal end portion, the truncated spherical portion being situated axially between the first and second longitudinal end portions.

9. A ball joint housing for a connecting rod of a wiper actuating linkage system, the ball joint housing having an internal cavity configured to receive a complementary crank pin of claim 1, wherein the internal cavity has at least one first holding portion for holding the crank pin and a second opening portion that increases a dimension of the internal cavity.

10. The ball joint housing of claim 9, wherein the first portion defines a spherical portion.

11. The ball joint housing of claim 9, wherein the internal cavity has at least two opposite first, holding portions and at least two opposite second, opening portions such that the maximum distance between the two second portions is greater than the maximum distance between the two first portions.

12. The ball joint housing of claim 9, having an elongate overall shape along a longitudinal axis passing through the center of the internal cavity.

13. The ball joint housing of claim 12, wherein the internal cavity has a cavity bottom of cylindrical overall shape centered on the longitudinal axis of the ball joint housing.

14. A wiper actuating linkage system having
a connecting rod that has an elongate overall shape, wherein the connecting rod has a ball joint housing at one longitudinal end, comprising:
an internal cavity configured to receive a complementary crank pin of claim 1 in a predefined angular assembly position,
the internal cavity having a first holding portion for holding the crank pin and a second opening portion that increases a dimension of the internal cavity;
wherein a spherical sector of a truncated spherical portion of the crank pin is arranged so as to bear against the facing first holding portion of the ball joint housing.

15. A method for assembling a connecting rod of the linkage system of a wiper actuating linkage system, having a ball joint housing at one longitudinal end, wherein the method comprises:
inserting a crank pin into an internal cavity of the ball joint housing that is carried by the connecting rod through a relative translational movement, such that a spherical sector of a truncated spherical portion of the crank pin is arranged next to a second opening portion of the internal cavity of the ball joint housing, and such that the truncated sector of the truncated spherical portion of the crank pin is arranged next to a first, holding portion of the internal cavity of the ball joint housing; and carrying out a relative rotational movement between the crank pin and the ball joint housing, as far as a predefined angular assembly position in which the spherical sector of the truncated spherical portion of the crank pin is next to the first holding portion of the internal cavity of the ball joint housing.

\* \* \* \* \*